Sept. 11, 1951 J. P. SPALDING 2,567,247

PULSE GENERATOR

Filed Nov. 14, 1945

Inventor
JOSEPH P. SPALDING

By Ralph L. Chappell

Attorney

Patented Sept. 11, 1951 2,567,247

UNITED STATES PATENT OFFICE 2,567,247

PULSE GENERATOR

Joseph P. Spalding, Silver Spring, Md.

Application November 14, 1945, Serial No. 628,635

1 Claim. (Cl. 250—27)

(Granted under the act of March 3, 1883, as amended April 30, 1928; 370 O. G. 757)

This invention relates generally to an electronic signal generator, and particularly to a voltage impulse generator.

Among the numerous qualities which determine the excellence of a voltage impulse generator, are; its ability to produce a voltage pulse having sharply defined edges; its ability to produce a pulse of variable duration and repetition rate, and very importantly, its operating efficiency as expressed in terms of quiescent current drain.

It is accordingly an object of this invention to provide a pulse generator whose between pulse current drain is a minimum.

It is another object of this invention to provide a circuit for producing a voltage impulse of adjustable duration and repetition rate.

It is another object of this invention to provide a circuit for producing a voltage impulse having sharply defined edges.

Other objects and features of the present invention will become apparent upon a careful consideration of the following detailed description, when taken together with the accompanying drawings.

Figure 1:
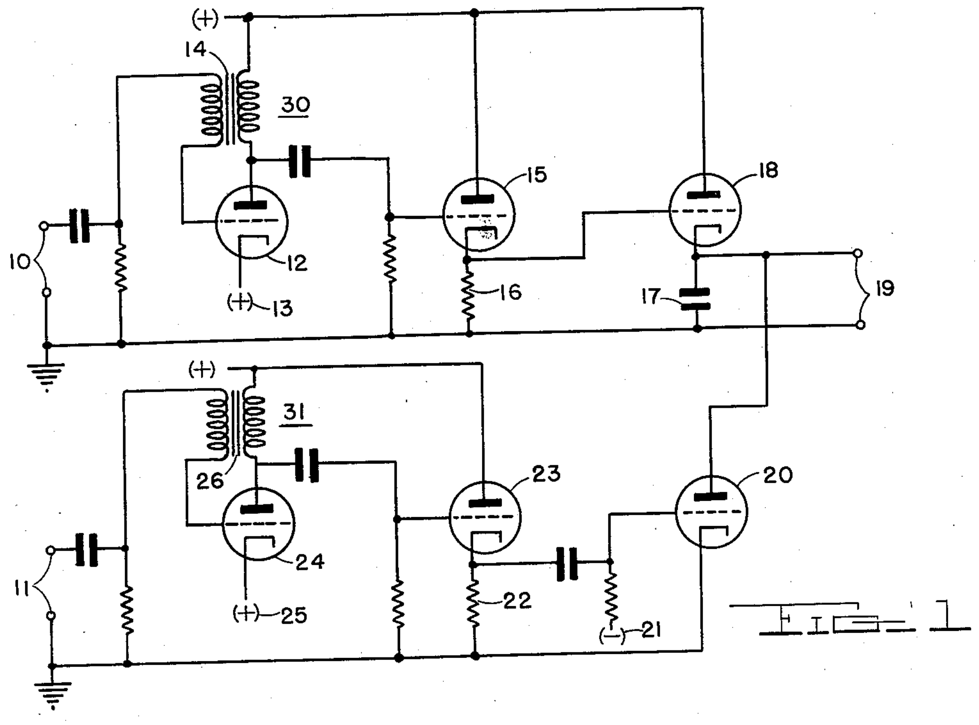
Figure 2:
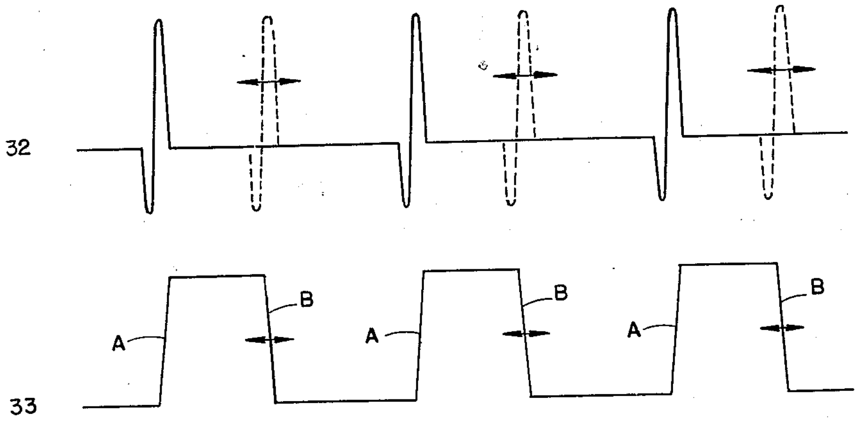

Fig. 1 is a detailed circuit diagram of a specialized embodiment of the invention, and Fig. 2 shows a series of waveforms useful in explaining the operation of Fig. 1.

As taught by the invention, voltage pulses are produced by first charging a suitable energy storing component from the output signal of a first impulse generator, which is preferably a blocking oscillator. Thereafter, a normally non-conducting discharge tube, connected in shunt with the energy storing component, is rendered conducting by the action of a second impulse generator, also preferably a blocking oscillator, and the charge on the energy storing component is abruptly dissipated. The resulting voltage pulse thus produced across the energy storing component possesses leading and trailing edges, the abruptness of which, depends upon the charge and discharge rates of the storage element. The pulse amplitude is sensibly the peak amplitude of the output signal from the first blocking oscillator, and the pulse duration is adjusted by control of the time sequence of operation of the first and second impulse generators.

In particular, a specialized embodiment of the invention is shown in Fig. 1, to which reference is now had. Terminals 10 represent an input connection for the application of a suitable trigger signal to the first impulse generator, blocking oscillator 30. Comprising the first blocking oscillator 30, is a vacuum tube component 12 and a transformer 14. The primary winding of transformer 14 is serially connected in the plate lead of tube 12, and the secondary winding is connected to the grid of tube 12. The latter connection provides the regenerative feedback necessary for blocking oscillator operation. In keeping with the feature of maintaining the quiescent current drain of the circuit at a minimum, tube 12 is biased below cutoff by application of a positive voltage source, as indicated at 13, to its cathode. Since tube 12 is normally biased below cutoff, the initiation of operation by blocking oscillator 30 is accomplished by application, at terminals 10, of the positive trigger signal to the grid of tube 12. In response to such triggering signal, plate current commences to flow through the primary winding of transformer 14. Such plate current induces a voltage of such a phase in the grid winding of transformer 14 as to cause a further increase in plate current, and hence a further rise and grid voltage. This action is regenerative, and continues until such a point is reached in the transconductance curve of the tube as to prevent further increase in plate current. At this instant, the grid drives sharply negative, and tube 12 is returned to its normal condition of cutoff. The foregoing chain of events generates at the output of the blocking oscillator, across the primary winding of transformer 14, a single cycle voltage impulse; the first excursion of which is negative.

The blocking oscillator output is fed through tubes 15 and 18 to the storage capacitor 17. The latter is disposed, in the cathode circuit of tube 18; so that it will operate to hold tube 18 below cutoff, and also so that it will charge up to a voltage substantially equal to the positive peak amplitude of the blocking oscillator output. By reason of the unbypassed cathode resistor 16, tube 15 functions as a cathode follower. The purpose of tube 15 is to shield grid current flow in tube 18 from blocking oscillator 30. Such grid current represents a low impedance load, and if tube 18 were directly connected to the blocking oscillator 30, it would disturb the latter's operation. Consequently, by coupling the output of blocking oscillator 30 through tube 15 to tube 18, the grid flow in the latter tube can be furnished by tube 15 without impairing the operation of blocking oscillator 30. Again, in keeping with the feature of minimizing the quiescent current drain of the circuit, the cathode load resistance 16 of tube 15 is made as large as permissible Terminals 11 represent an input connection for the application of a triggering signal to the second blocking oscillator 31. Similar to blocking oscillator 30, blocking oscillator 31 comprises a vacuum tube component 24 and a transformer 26. The primary winding of transformer 26 is serially connected in the plate lead of tube 24, and the secondary winding of transformer 26 is connected to the grid of tube 24. The latter connection provides the regenerative action necessary for blocking oscillator operation. Again, like tube 12 in blocking oscillator 30, tube 24 is biased below cutoff by application of a positive voltage source, indicated at 25, to its cathode. Again, like blocking oscillator 30, the triggering pulse applied at terminals 11 must be positive to start the operation of blocking oscillator 31. The output signal from blocking oscillator 31 is obtained from the plate of tube 24 and applied through the cathode follower 23 to the grid of tube 20. Tube 20 is representative of a discharge tube for capacitor 17, and is therefore connected in shunt with capacitor 17. As aforementioned, the discharge tube 20 is normally biased below cutoff and is rendered conducting by the action of the second blocking oscillator 31. Bias for tube 20 is obtained from a negative source indicated at 21 and applied to the grid of tube 20. Tube 23 like tube 15 is connected as a cathode follower in order to prevent loading of the second blocking oscillator 31. Cathode load resistance 22 of tube 23 like that of tube 15 is made large as permissible in order to minimize the quiescent current flow through tube 23.

From the foregoing it will be recognized that in the quiescent condition of the circuit, tubes 12, 18, 20 and 24, are held in a nonconducting condition, and tubes 15 and 23 pass only a small insignificant current. It will also be recognized that in the production of a pulse at the output terminals 19, the flow of operational current occurs only during the production of the leading and trailing edges of the pulse. During the interval between the leading and trailing edges of the pulse, the circuit returns to its normal low current consuming condition.

For a more detailed description of the operation of the circuit of Fig. 1, reference is now had to Fig. 2. The solid line of waveform 32 represents the single cycle output of blocking oscillator 30, and the dotted lines represent the time related single cycle output of blocking oscillator 31. As aforementioned both blocking oscillators 30 and 31 are normally held inoperative and are controlled from any suitable external signal source or sources connected to terminals 10 and 11 respectively. For instance, in a specialized case, the triggering signals applied at terminals 10 and 11 could be obtained from the plate electrodes of a free running multivibrator. A trigger signal impressed at terminals 10 causes the production of the single cycle voltage impulse, as represented by the solid lines in waveforms 32. The negative half cycle of this voltage impulse is suppressed from the output terminals 19 since tubes 15 and 18 both operate at substantially cut-off potential. The positive half cycle however, drives tube 18 rapidly into conduction and capacitor 17 receives a positive charge as illustrated by portion A in the time related waveform 33. The leading edge of the output pulse is thus formed. As shown by waveform 33 this leading edge contains a slight slope, which is a function of the current carrying capacity of tube 18 and the size of charging capacitor 17. Since either of these two factors are variable, the slope of the leading edge of the pulse can be minimized by selecting a tube of high current carrying capacity at 18. A selectable time interval after the application of a trigger pulse to terminals 10, a similar trigger pulse will be applied to terminals 11 to cause operation by blocking oscillator 31. The dotted lines of waveform 32 represent the time related single cycle voltage output of blocking oscillator 31. Again, the negative half cycle of the output of the blocking oscillator 31 is eliminated by the action of tubes 20 and 23. The positive half cycle however, drives tube 20 rapidly into conduction and capacitor 17 is discharged as indicated by portion B of waveform 33. Again the slope of the trailing edge of the resulting pulse appearing at terminals 19, is a function of the size of capacitor 17 and the current carrying capacity of tube 20. And again by choosing a tube of the high current carrying capacity type at 20, the slope of this edge may be minimized. The time relation between the triggering impulses applied at terminals 10 and 11 determine the duration of the pulse. The amplitude of the pulse is substantially equal to the peak amplitude of the positive excursion of the signal output from the first blocking oscillator 30, or the plate supply voltage for tube 18 whichever is the lesser.

Although I have shown and described only a certain and limited embodiment of the invention it is to be understood that I am fully aware of the many modifications possible thereof. For example, among the obvious modifications would be to interpose a cathode follower between the output terminals 19 and a load connected thereto. Such an arrangement would aid in preserving the flatness in the top of the output waveform. Therefore this invention is not to be limited except insofar as necessitated by the spirit of the prior art and the scope of the appended claim.

The invention described herein may be manufactured and used by or for the Government of the United States of America for governmental purposes without the payment of any royalties thereon or therefor.

What is claimed is:

A pulse generator comprising, an energy storing capacitor, a first blocking oscillator coupled to said energy storing capacitor and operable in response to the application of an external signal to instantaneously apply a full charge to said capacitor, means including a normally non-conducting vacuum tube component connected in shunt with said capacitor for discharging the same, and a second blocking oscillator coupled to said vacuum tube component and operable in response to an external signal for rendering said vacuum tube conducting, to thereby produce a rectangular voltage pulse across said energy storing component.

JOSEPH P. SPALDING.

REFERENCES CITED

The following references are of record in the file of this patent:

UNITED STATES PATENTS

| Number | Name | Date |
|---|---|---|
| 2,175,900 | Knight | Oct. 10, 1939 |
| 2,188,970 | Wilson | Feb. 6, 1940 |
| 2,284,101 | Robins | May 26, 1942 |
| 2,335,265 | Dodington | Nov. 30, 1943 |
| 2,413,440 | Farrington | Dec. 31, 1946 |
| 2,419,340 | Easton | Apr. 22, 1947 |
| 2,439,321 | Starr | Apr. 6, 1948 |
| 2,440,932 | Cooper | May 4, 1948 |
| 2,448,070 | Sunsten | Aug. 31, 1948 |
| 2,457,140 | Frankel | Dec. 28, 1948 |
| 2,472,209 | Hall | June 7, 1949 |